US008910236B2

(12) United States Patent  (10) Patent No.: US 8,910,236 B2
Landry et al.  (45) Date of Patent: Dec. 9, 2014

(54) SYSTEM AND METHOD FOR ENABLEMENT OF DESKTOP SOFTWARE FUNCTIONALITY BASED ON IT POLICY

(75) Inventors: Paul Edward Landry, Milton (CA); Timothy Richard Tyhurst, Kitchener (CA)

(73) Assignee: BlackBerry Limited, Waterloo (CA)

( * ) Notice: Subject to any disclaimer, the term of this patent is extended or adjusted under 35 U.S.C. 154(b) by 180 days.

(21) Appl. No.: 13/279,856

(22) Filed: Oct. 24, 2011

(65) Prior Publication Data

US 2013/0104184 A1    Apr. 25, 2013

(51) Int. Cl.
*G06F 21/00* (2013.01)
*G06F 21/60* (2013.01)

(52) U.S. Cl.
CPC .................................. *G06F 21/604* (2013.01)
USPC .................. 726/1; 726/22; 726/29; 370/254; 370/328; 370/338

(58) Field of Classification Search
USPC ................................................ 726/1, 22, 29
See application file for complete search history.

(56) References Cited

U.S. PATENT DOCUMENTS

| 6,964,051 B1 | 11/2005 | Palaniappan |
| 7,317,699 B2 * | 1/2008 | Godfrey et al. ............... 370/328 |
| 7,358,916 B2 | 4/2008 | Milyakh |
| 7,899,779 B1 | 3/2011 | Oganesyan |
| 8,065,712 B1 * | 11/2011 | Cheng et al. ...................... 726/1 |
| 2005/0044367 A1 | 2/2005 | Gasparini et al. |
| 2007/0204324 A1 | 8/2007 | Roberts et al. |
| 2008/0089302 A1 * | 4/2008 | Godfrey et al. ............... 370/338 |
| 2008/0195769 A1 | 8/2008 | Anwer |
| 2008/0243525 A1 | 10/2008 | Clark et al. |

OTHER PUBLICATIONS

"Group Policy: Fundamentals, Security, and the Managed Desktop"; by Jeremy Moskowitz;John Wiley & Sons, 2010; 1200 pages, ISBN 0470769807.*
BlackBerry Desktop Software Version: 6.0.0 User Guide (2010).
Canadian Office Action on Canadian Application No. 2,755,701; issued Dec. 9, 2013.

* cited by examiner

*Primary Examiner* — Jason Lee
(74) *Attorney, Agent, or Firm* — Moffat & Co.

(57) ABSTRACT

A method, device and system for enablement of desktop software functionality based on IT policy comprising determining if IT policy settings are associated with a mobile device connected to the desktop software and restricting functionality of the desktop software based on the IT policy settings for the connected mobile device.

13 Claims, 6 Drawing Sheets

SYSTEM AND METHOD FOR ENABLEMENT OF DESKTOP SOFTWARE FUNCTIONALITY BASED ON IT POLICY

FIELD OF THE DISCLOSURE

The present disclosure relates to mobile devices and in particular to data and application security on mobile devices.

BACKGROUND

Mobile devices offer a great deal of functionality that allows the device to be used for both corporate and personal use. For example users may wish to use the device for personal applications such as games, really simple syndication (RSS) reading, web browsing, media playing, VOIP communication and general leisure. However corporations may want a device to be used for a subset of functionality required for a user to complete their job.

When a mobile device is issued by a corporation to an employee the corporation may choose to limit certain functionality on the device in order, for example, to reduce the risk of exposure of corporate data on the mobile device. This may be done, for example, through information technology (IT) policies. An IT policy is a set of rules that dictate the functionality of a device that operates on a network. Accordingly, an IT administrator can use IT policy to ensure that all devices comply with certain rules, and are limited to certain functionality. For instance, the IT administrator can use IT policy to allow the use of certain features on a device, specify certain security settings for the device, specify applications that are allowed to execute on the device, and the like. The IT policy can be sent to the device via a wired or wireless connection depending on the nature of the network and whether or not the device is connected by a wired connection.

IT policy may also be enforced on desktop software running on a workstation computer connected to the same corporate network as the mobile device. For example, when the mobile device is connected to the computer the desktop software may list applications that are currently on the device and any new or updated applications that are available for download to the mobile device. Alternatively the organization may not want to permit the user to add, update, or delete device applications. Typically these policies come from an administrator and are easily applied to computers on the corporate network.

However the rapidly increasing functionality offered on mobile devices encourages corporate mobile devices to be used for both corporate and personal matters. While corporate policy can easily be applied to workstation software on a corporate computer, the corporation typically has no ownership or jurisdiction over the user's home computer any. Indeed, the home computer may be shared with other users such as family members who expect a different user experience than the corporate member.

With desktop software being used both by managed (typically corporate) mobile devices and unmanaged (typically personal) mobile devices, enforcing IT policies can be challenging. In addition, a single mobile device may have both 'managed corporate' and an 'unmanaged personal' aspects. Thus regulating the functionality of the desktop application on the user's home computer in order to enforcing IT policies may not be possible.

Similarly a workstation may be a "shared use" one which does not require end-users to use distinct credentials to identify themselves to the workstation (and corporate network). That is—the workstation cannot identify the user based on the logged in security principal. This is sometimes used for a shared use computer on a shop floor, for example. With many devices may connected to a workstation may require multiple instances of the desktop application to be run in order to enforce the appropriate IT policy challenging the management or administration of the functionality of desktop applications used by different devices.

BRIEF DESCRIPTION OF THE DRAWINGS

The present disclosure will be better understood with reference to the drawings in which.

DETAILED DESCRIPTION

Figure 1:
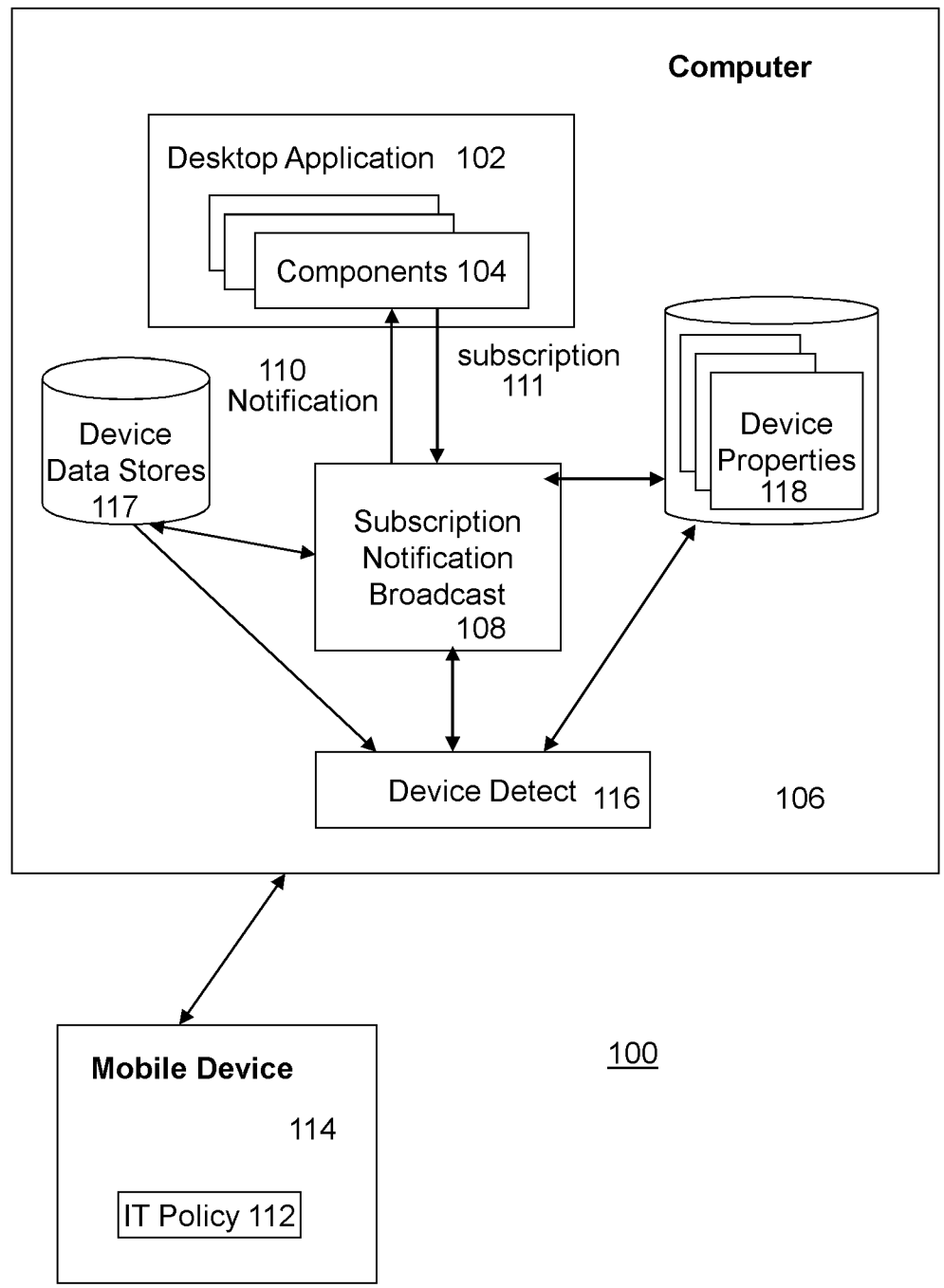
FIG. 1 is a block diagram showing a system according to an embodiment of the present disclosure.

In the following description like numerals refer to like elements in the drawings.

The present matter provides a method and system for customizing and regulating functionality of a desktop application based on administrative privileges granted to a device by a device administrator.

The present method and system further allows for management of multiple devices simultaneously and provides for the usage of the desktop application for managed (corporate) and unmanaged (personal) devices using the same instance of the desktop software.

Desktop application software is provided with a mobile device and is designed to link content and applications on a mobile device with the user's computer. The desktop software typically complementary to the mobile device and may perform tasks like: synchronizing organizer data (such as calendar entries, contacts, tasks, and memos) with and media files (such as music, pictures, and videos) a workstation or network; back up and restore of the device data; manage and update device applications; transfer device settings and data to a new mobile device; use the device as a modem to connect to the Internet from the computer; manage multiple devices and charge the device.

The desktop software provides information about the connected device, such as the model information and the last dates that the data was backed up and synchronized. It can also provide the user with access to the tasks, such as backing up data, opening device options, checking for device software updates, and synchronizing the organizer data and media files. Furthermore the desktop software can connect more than one device and allow a user to switch between them.

The organization may desire to restrict one or more of these tasks or functionality of the desktop software for a corporate user for variety of policy reasons.

Accordingly the present disclosure provides a system for enablement of desktop software functionality based on IT policy associated with a mobile device comprising: a module for determining if an IT policy is associated with a mobile device connected to the desktop software; and a module for restricting functionality of the desktop software based on the IT policy for the connected mobile device.

The present disclosure further provides a method for enablement of desktop software functionality based on IT policy comprising: determining if an IT policy is associated with a mobile device connected to the desktop software; and restricting functionality of the desktop software based on the IT policy for the connected mobile device.

Still further the desktop software includes a graphical user interface (GUI) and the restricting comprises one or more of hiding aspects of the desktop software GUI, disabling input fields in the desktop application GUI, pre-configuring input fields in the desktop application GUI, unloading modules or loading predetermined modules.

The present disclosure provides for a mobile device, but is not meant to be limited to any particular mobile device. Examples of mobile devices can include smart phones, personal digital assistants, data enabled cellular telephones, tablet computers, among others.

Reference is now made to FIG. 1, which shows an overall architecture 100 of a system for regulating functionality of desktop software on a computer 106 The system includes a desktop application 102 having one or more application components 104 configured for execution on the desktop computer 106, a notification broadcast and subscription module 108 for broadcasting notifications 110 to subscribing 111 application components 104 regarding policy settings 112 of a connected mobile device 114 when a device detection module 116 detects that the mobile device 114 has been connected to the computer 106 one or more data stores 117 for providing previously stored policy information associated with the detected mobile device 114 or for storing a policy information as an associated set of properties 118 for the device. The application components 104 being configured to analyze the associated policy 112 and for disabling or enabling functionality of the application components 104 as prescribed in the associated policy information.

In an exemplary embodiment the computer 106 is a desktop computer, laptop computer, etc. The elements (not shown) of a typical computer such as a processor, memory input-out interfaces, keyboard, display and software such as an operating system, bios, drivers etc. are well know and will nor be described further. Furthermore it is assumed that the application components 104 are configured for responding to messages or notifications for enabling or disabling functionality of various features of the application components or of the components themselves. For example, in one implementation a public abstract interface could be defined that the subscription module 108 implements and registers/publishes within the desktop application 102. The application components discover this registration from 102 and use it to subscribe 111 and receive notifications 110 from the subscription module 108.

In a further embodiment (not shown) the system 100 may include more than one mobile device 114 connected to the desktop application 102. The connected devices may or may not have an IT policy associated therewith. If the mobile device is issued to a corporate user then an IT policy 112 may be assigned to the device. The IT policy 112 is typically stored in a persistent storage device within the device. The IT policy 112 can include any number of rights, privileges, security controls and the like as is known in the art.

Figure 2:
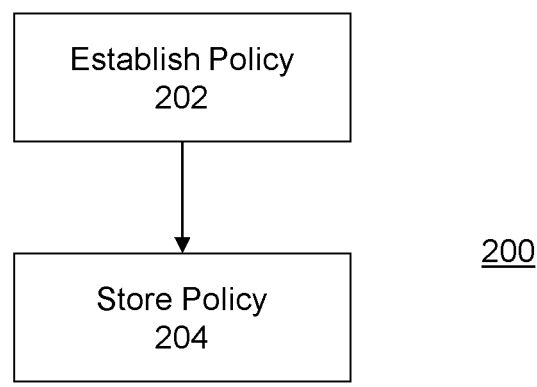
FIG. 2 is a flow diagram showing managing a corporate policy on a mobile device in accordance with the present disclosure.

Referring to FIG. 2 a method for managing a corporate policy on a mobile device is depicted in the form of a flow chart and indicated generally at 200. For the purposes of helping to further explain system 100 the method 200 will be explained in terms of its performance on system 100. It should be understood however, that system 100 and method 200 can be varied and that method 200 can be performed on different configurations of systems. Firstly at block 202 a policy is established, typically by an enterprise administrator who will use appropriate user-interfaces on a terminal (not shown) to interact with a server (not shown), so as to define an IT policy 112. As previously mentioned, the IT policy 112 can have different structures. Next, at step 204, the policy is stored on the device. For example the enterprise administrator may use appropriate user-interfaces on a terminal to then cause policy as defined at 202 to be carried via the mobile device network and base station for storage on the mobile device 114. Alternatively the policy may be stored in a central repository accessible to the mobile device via the mobile device network or in a database or in mailbox properties of the user's corporate email account. Any updates or changes to the IT policy for the device or user may then be subsequently pushed to the device.

Figure 3:
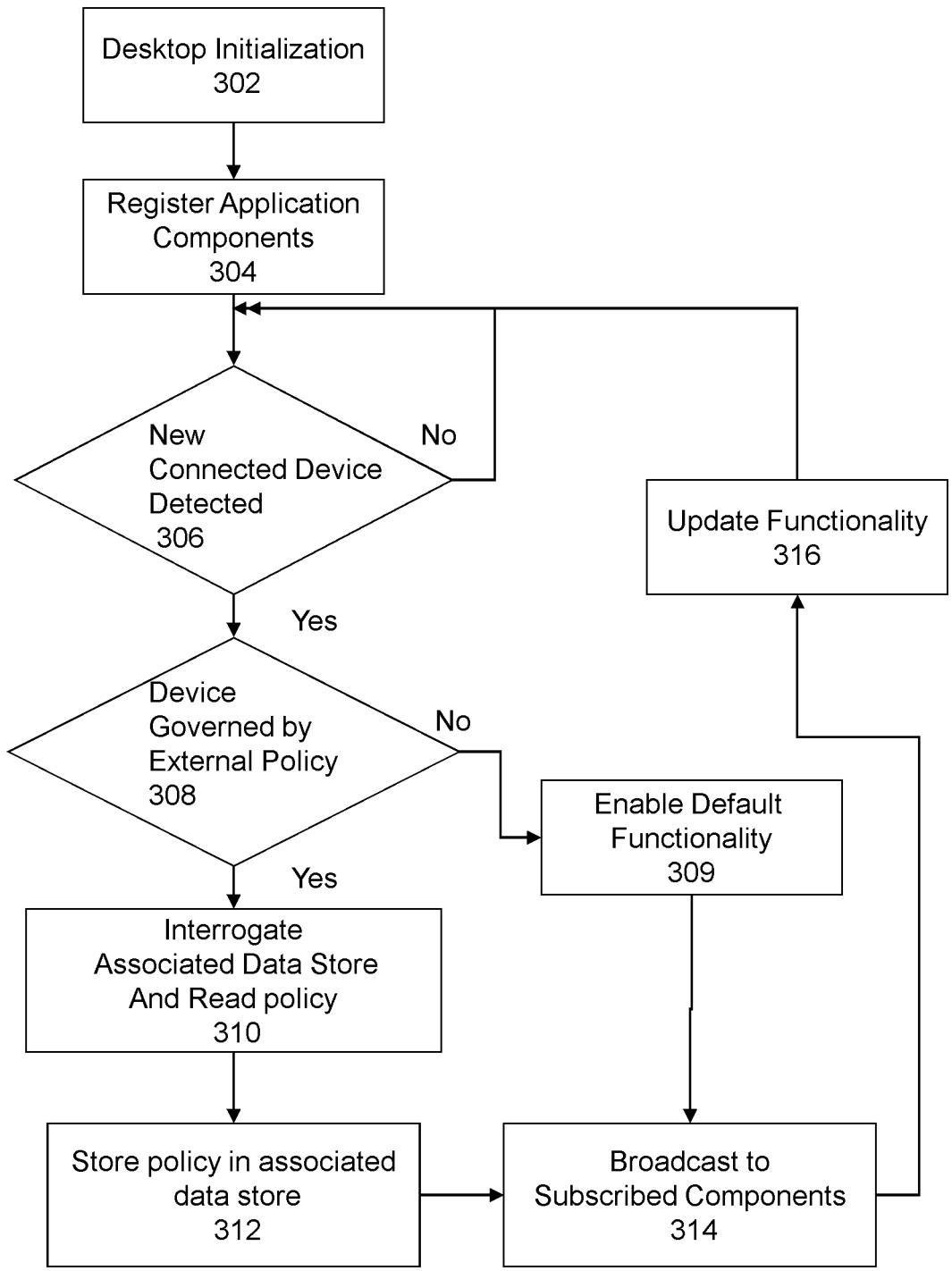
FIG. 3 is a flow diagram showing an exemplary method in accordance with the present disclosure.

Referring to FIG. 3, there is shown a flow chart 300 depicting a method for enablement of desktop software functionality based on an IT policy according to an embodiment of the present matter. For the purposes of helping to further explain system 100 the method 300 will be explained in terms of its performance on system 100. At block 302 the desktop application 102 is loaded and initialized and registers or subscribes 304 each application component 104, capable of being regulated based on an administrative policy with the notification broadcast module 108. The notification module maintains, for example, a table identifying subscribed applications and provides notification to these components regarding policy settings. Other implementations will be evident to persons in the art. At block 306 the device detection module 116 on the computer is configured to detect whether the mobile device 114 is connected to the desktop computer 106 such as through a USB port, by being plugged into a cradle or by wireless connection (e.g. Bluetooth). Usually this detection is provided to the module 116 from a lower level procedure within the desktop computer. Furthermore this detection is done before the desktop application displays an interface specific to the device, since this provides an opportunity to tailor its functionality before displaying its graphical user interface or performing any of the tasks describe earlier. Alternatively the desktop application may show a UI and may also use stored information from the device data stores 117 and device properties 118 when no device is currently attached. If the mobile device 114 is detected the detection module will determine whether the device is governed by an external set of policies 308 and if not then a default functionality 309 of the desktop is assigned and is broadcast 314. This is performed by for example by obtaining the unique device identification from the device, as is known in the art and then accessing the appropriate data store associated with the device 310. As described earlier this will depend on where the associated policy information was previously stored, such as on the device or in the associated mailbox properties or in a database. After the policy information is read it is stored 312 as an associated set of properties in the device data stores 117 and/or the device properties 118 for the device on the desktop. This is to ensure that the most recent set of policies for the device are used. Also by caching on the workstation the system has the (last known) policy/property data for the device, so the desktop software UI can be customized even when the device isn't currently connected to the workstation.

As will be appreciated this could be implemented in any number of ways for example a table of device identifications pointing to a policy table could be used or the policy could be stored directly in mailbox properties for the device. Next the policy information is broadcast 314 to all the component applications that were previously subscribed at step 304. At block 316 the policy is applied by the subscribing components.

Figure 4:
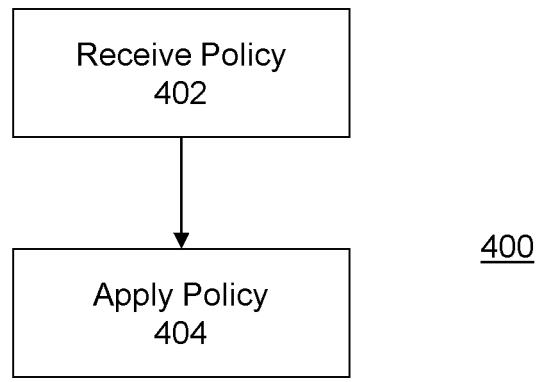
FIG. 4 is a flow diagram showing an exemplary method at a desktop application in accordance with the present disclosure.

Referring to FIG. 4 a method for applying a policy to a desktop application is depicted in the form of a flow chart and indicated generally at 400. For the purposes of helping to further explain system 100 the method 400 will be explained in terms of its performance on system 100. It should be understood however, that system 100 and method 400 can be varied and that method 400 can be performed on different configurations of systems. At block 402 a policy is received by the component application from the broadcast module 108, this could be implemented in any number of ways such as for example by receiving a data string. Next the policy is applied 404 by the component. As is well understood most users interact with software via a graphical user interface (GUI). Thus the features or functionality of the desktop software that is typically enabled or disabled relates to functions offered through its GUI. This could be implemented by calling a routine to enable or disable particular features of the subject component application and could include hiding or showing certain aspects of the application or disabling while remaining visible certain fields in a display window or even pre-configuring certain fields. It will be appreciated that many other techniques could be used.

Based on the above it may be seen that the subject disclosure allows features and functionality of an application to be dynamically enabled or disabled. In particular the present disclosure describes a system and method that allows desktop software to be regulated even when not connected to a corporate network and which can be applied to multiple connected mobile devices.

Figure 5:
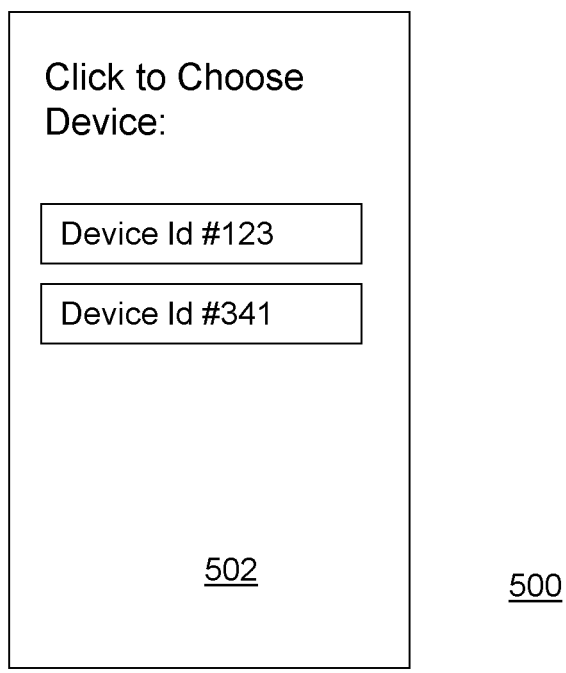
FIG. 5 is a graphical representation of a device selection screen in accordance with the present disclosure.

Furthermore, if multiple devices (not shown) are connected to the same instance of the desktop software a menu item window 502 as illustrated graphically in FIG. 5 may be displayed so that a user may administer individual devices through a selection mechanism on the menu.

For example if multiple devices are connected the detection module will obtain a device Id, e.g. Device Id #123, Device Id #341 shown in FIG. 5, for each of the devices, then when the user changes in the menu selection the focus to another device, the method described above with respect to FIG. 3, steps 306 onward, and FIG. 4 may be repeated for this current 'focus' device and the policy of this current "focus" device will be broadcast to the subscribed application components. Thus again the component applications will dynamically apply this policy to tailor their current functionality.

It may be seen from the above that by having the desktop application interrogate and obtain IT policies for a device allows it to regulate its functionality if the device is under corporate IT policy while allowing regular usage of the desktop functionality even when the desktop is not connected to the corporate network. This provides for more flexibility for a user and a better user experience and a better management of corporate devices. Furthermore this allows for the usage of the desktop application for many devices with the same instance of the desktop software.

In one embodiment the methods exemplified in FIGS. 3 and 4 may be implemented within the desktop software or in an alternative embodiment various blocks may be implemented as separate modules to the desktop software. Furthermore, the present system allows for minimal or no modification to existing mobile devices or system architecture.

Figure 6:
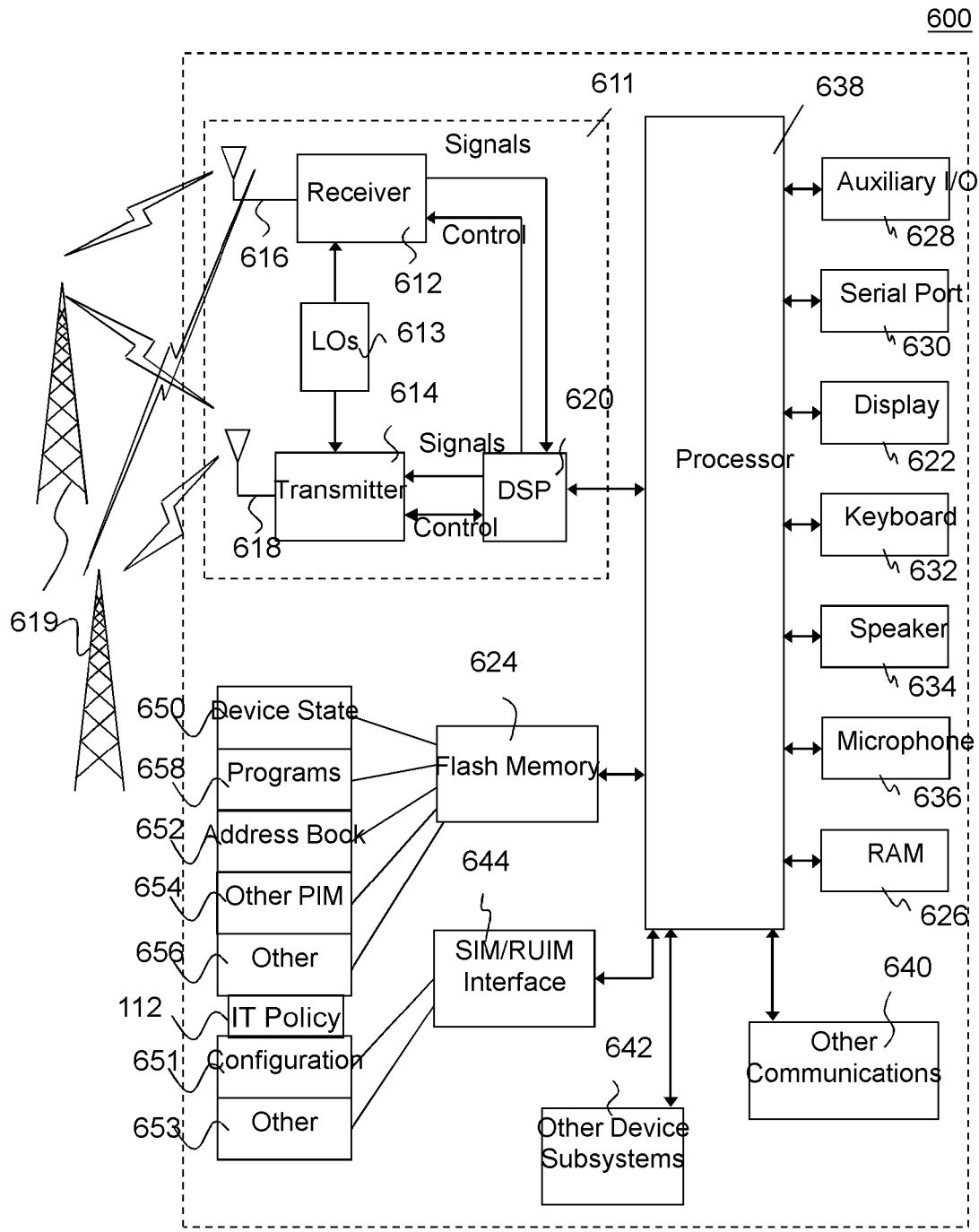
FIG. 6 is a block diagram showing an exemplary mobile device capable of being used with the present disclosure.

Reference is now made to FIG. 6 in which there is illustrated an exemplary mobile device. The mobile device of FIG. 6 is however not meant to be limiting and other mobile devices could also be used.

Mobile device 600 is typically a two-way wireless communication device having voice and data communication capabilities. Mobile device 600 generally has the capability to communicate with other devices or computer systems. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 600 is enabled for two-way communication, it will incorporate a communication subsystem 611, including both a receiver 612 and a transmitter 614, as well as associated components such as one or more antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate.

Network access requirements will also vary depending upon the type of network 619. In some networks, network access is associated with a subscriber or user of mobile device 600. A mobile device may require a removable user identity module (RUIM) or a subscriber identity module (SIM) card in order to operate on the network. The SIM/RUIM interface 644 may be similar to a card-slot into which a SIM/RUIM card can be inserted and ejected like a diskette or PCMCIA card. The SIM/RUIM card can have memory and hold many key configuration 651, and other information 653 such as identification, and subscriber related information.

When required network registration or activation procedures have been completed, mobile device 600 may send and receive communication signals over the network 619. As illustrated in FIG. 6, network 619 can consist of multiple base stations communicating with the mobile device. For example, in a hybrid CDMA 1×EVDO system, a CDMA base station and an EVDO base station communicate with the mobile station and the mobile device is connected to both simultaneously. In other systems such as Long Term Evolution (LTE) or Long Term Evolution Advanced (LTE-A), multiple base stations may be connected to for increased data throughput. Other systems such as GSM, GPRS, UMTS, HSDPA, among others are possible and the present disclosure is not limited to any particular cellular technology.

Signals received by antenna 616 through communication network 619 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile device 600 generally includes a processor 638 which controls the overall operation of the device. Communication functions, including data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art having the benefit of the present disclosure.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list, among other applications.

Operating system software used by the processor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. The applications may be segregated based on the mode or category they fall into. Memory 624 may further provide security for corporate data and if some applications are locked while others are not.

Processor 638, in addition to its operating system functions, may enable execution of software applications on the mobile device. A predetermined set of applications that control basic operations, including at least data and voice communication applications for example, will normally be installed on mobile device 600 during manufacturing. Other applications could be installed subsequently or dynamically.

Applications and software, such as those for implements the process of FIGS. 1 and 3, may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 619. In one embodiment, the PIM data items are seamlessly integrated, synchronized and updated, via the wireless network 619, with the mobile device user's corresponding data items stored or associated with a host computer system. Further applications may also be loaded onto the mobile device 600 through the network 619, an auxiliary I/O subsystem 628, serial port 630, short-range communications subsystem 640 or any other suitable subsystem 642, and installed by a user in the RAM 626 or a non-volatile store (not shown) for execution by the processor 638. Such flexibility in application installation increases the functionality of the device and may provide enhanced on-device functions, communication-related functions, or both. For example, secure communication applications may enable electronic commerce functions and other such financial transactions to be performed using the mobile device 600.

In a data communication mode, a received signal such as a text message or web page download will be processed by the communication subsystem 611 and input to the processor 638, which may further process the received signal for output to the display 622, or alternatively to an auxiliary I/O device 628.

A user of mobile device 600 may also compose data items such as email messages for example, using the keyboard 632, which may be a complete alphanumeric keyboard or telephone-type keypad, among others, in conjunction with the display 622 and possibly an auxiliary I/O device 628. Such composed items may then be transmitted over a communication network through the communication subsystem 611.

For voice communications, overall operation of mobile device 600 is similar, except that received signals would typically be output to a speaker 634 and signals for transmission would be generated by a microphone 636. Alternative voice or audio I/O subsystems, such as a voice message recording subsystem, may also be implemented on mobile device 600. Although voice or audio signal output is preferably accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable, but is an optional device component. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the mobile device to a computer to act as a modem.

Other communications subsystems 640, such as a short-range communications subsystem, is a further optional component which may provide for communication between mobile device 600 and different systems or devices, which need not necessarily be similar devices. For example, the subsystem 640 may include an infrared device and associated circuits and components or a Bluetooth™ communication module to provide for communication with similarly enabled systems and devices.

Figure 7:
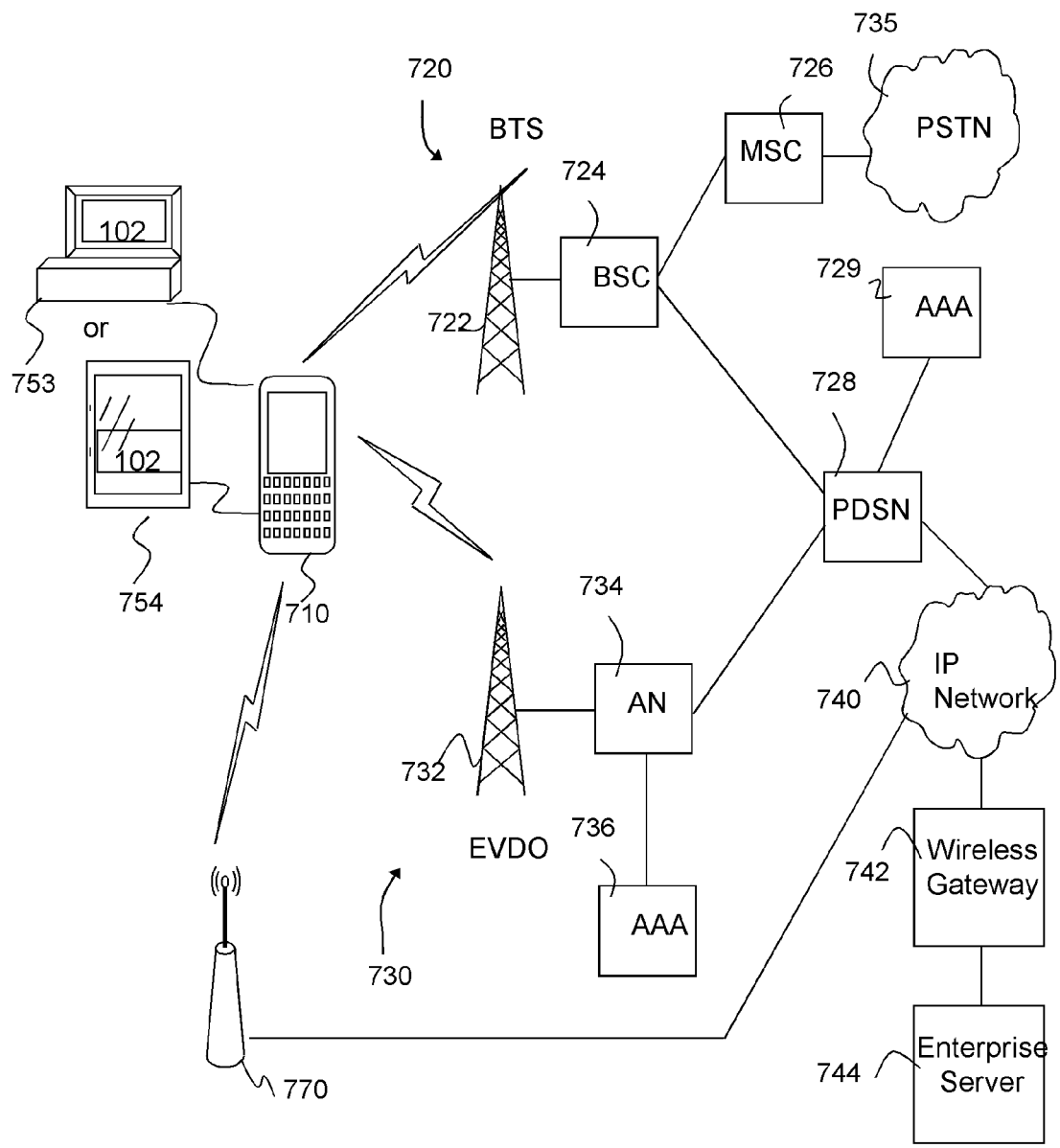
FIG. 7 is a system architecture diagram for a mobile device.

Reference is now made to FIG. 7, which shows a block diagram of an exemplary wireless data network in accordance with the present disclosure and with which the various embodiments of the methods of the instant disclosure may cooperate. FIG. 7 shows a block diagram of a mobile device 710 and exemplary CDMA 1x network 720, an exemplary EVDO network 730, a public switched telephone network (PSTN) 735, a data network 740, wireless gateway 742 and enterprise server 744. This is shown merely as an example, and other network architectures, such as GSM, GPRS, UMTS, LTE, LTE-A, HSDPA, among others are possible.

The mobile device 710 is typically a two-way communication device having data and voice communication capabilities. FIG. 6 further shows an access point 770 for use with an alternative data connection such as a WiFi or WiMAX connection.

CDMA network 720 is comprised of a base transceiver station (BTS) 722 and a base station controller (BSC) 724. Base station controller 724 communicates with a mobile switching centre 726 which, as will be appreciated, is a circuit switched only component communicating with PSTN 735. Base station controller 724 further communicates with a packet data serving node (PDSN) 728 which is a packet switched only component. PDSN 728 further communicates with IP network 740.

EVDO network 730 contains an EVDO sector 732 which communicates with access node (AN) 734. Since the EVDO network 730 is a data only network, access node 734 communicates only with PDSN 728 and not with any circuit switch components.

An authentication, authorization and accounting node 736 is associated with AN 734, and a similar node 729 is associated with PDSN 728.

Operationally, mobile device 710 communicates wirelessly with CDMA network 720 using BTS 722 and BSC 724 to gain access to the CDMA 1x network.

Mobile device 710 sends and receives both data and voice services through CDMA network 720 until an EVDO network connection with established, at which point data can be transmitted over the EVDO network connection.

Further, mobile device 710 can be connected to a computing device 754 or 753 for a variety of reasons, some of which are provided above. For example the computing device 754 or 753 may be running the desktop application 102 an include the components of computer 106 as discussed above. The connection may be through various means such as a USB or other serial port, or by short range wireless communications with a computing device 754. Computing device 754 can then gain access to data network 740 and to enterprise server 744 through EVDO network 730 or CDMA network 720 using mobile device 710.

Mobile device 710 may further have capabilities to communicate through access point 770 using, for example, WiFi. Access point 770 connects to a data network 740 and thus access to wireless gateway 742 and enterprise server 744 are possible through access point 770

In one embodiment, enterprise server 744 could provide both the IT policies for the mobile device 710 and also provide access to a permanent store of the corporate data which can be accessed by mobile device 710.

As will be appreciated by those skilled in the art having the benefit of the present disclosure, the embodiment of FIG. 7 is merely an example and other networks models are possible for mobile device 710 to connect to enterprise server 744. The embodiment of FIG. 7 is not meant to be limiting to any particular network architecture.

Further, mobile device 710 may not be a dual mode or multi mode device that allows connection to WiFi. In this case, the WiFi connection to access point 770 would be removed from the embodiment of FIG. 6 and all communication may proceed over the cellular network through the base station 722 or 732. In other embodiments, mobile device 710 may only have access through an access point 770 and thus the cellular network would be removed from FIG. 6. Other possibilities would be apparent to those skilled in the art having the benefit of the present disclosure.

Computing device 754, may, in some embodiments, be a personal computing device. For example, computing device 754 may be a tablet computer or a personal computer 753. The user may further wish to use computing device 754 for corporate functions. However, for security reasons, the corporate IT department may not consider the computing device 754 to be a secure destination for data, since it is a personal device.

In order to overcome this, one solution would be to connect the non-secure computing device 754 or 753 to the secure (IT trusted) computing device 710.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for enablement of desktop software functionality based on information technology (IT) policy comprising:
   determining if IT policy settings are associated with a mobile device connected to the desktop software, wherein the IT policy settings are retrieved from the mobile device upon connection of the mobile device to the desktop software and the retrieved policy settings are broadcast to the mobile device; and
   restricting functionality of the desktop software based on the IT policy settings for the mobile device that is connected to the desktop software, wherein the desktop software includes a graphical user interface (GUI) and the restricting comprises one or more of hiding aspects of the desktop software GUI, disabling input fields in the desktop software GUI, pre-configuring input fields in the desktop software GUI, unloading modules or loading predetermined modules.

2. The method of claim 1, wherein the IT policy settings are stored on the mobile device.

3. The method of claim 1, wherein the IT policy settings are stored on a database accessible to the mobile device.

4. The method of claim 1, wherein the IT policy settings are stored in mailbox properties associated with a corporate email account associated with the mobile device.

5. The method of claim 1, wherein the desktop software includes a plurality of component applications.

6. The method of claim 5, including subscribing the component applications to a notification module for notification of policy settings.

7. The method of claim 5, including a plurality of mobile devices connected to the desktop software and said restricting being performed for each said connected mobile device.

8. The method of claim 7, including providing a user interface for selecting one of said plurality of connected mobile devices.

9. The method of claim 8, including subsequent to said selecting rebroadcasting said policy settings of said selected mobile device to said subscribed component applications.

10. The method of claim 1, wherein the IT policy settings are retrieved from the mobile device upon connection of the mobile device to the desktop software.

11. The method of claim 1, wherein the IT policy settings are retrieved from a database upon connection of the mobile device to the desktop software.

12. A system for enablement of desktop software functionality based on information technology (IT) policy associated with a mobile device comprising:
   a memory; and
   a hardware processor, the hardware processor configured to:
      determine if IT policy settings are associated with a mobile device connected to the desktop software wherein the IT policy settings are retrieved from the mobile device upon connection of the mobile device to the desktop software and the retrieved policy settings are broadcast to the mobile device; and
      restrict functionality of the desktop software based on the IT policy settings for the mobile device that is connected to the desktop software, wherein the desktop software includes a graphical user interface (GUI) and the restricting comprises one or more of hiding aspects of the desktop software GUI, disabling input fields in the desktop software GUI, pre-configuring input fields in the desktop software GUI, unloading modules or loading predetermined modules.

13. A mobile device comprising:
   a hardware processor; and
   a memory, the hardware processor and memory cooperating to provide upon connection of the mobile device to a desktop software, the desktop software including information technology (IT) policy settings associated with the mobile device, and the mobile device accessing functionality of the desktop software in accordance with the provided desktop application policy settings, wherein the IT policy settings are retrieved from the mobile device upon connection of the mobile device to the desktop software and the retrieved IT policy settings are broadcast to the mobile device;
   restricting functionality of the desktop software based on the IT policy settings for the mobile device that is connected to the desktop software; and
   wherein the desktop software includes a graphical user interface (GUI) and the restricting comprises one or more of hiding aspects of the desktop software GUI, disabling input fields in the desktop software GUI, pre-configuring input fields in the desktop software GUI, unloading modules or loading predetermined modules.

* * * * *